J. W. COOK.
ROCK CUTTING MACHINE.
APPLICATION FILED DEC. 13, 1920.
1,430,493.
Patented Sept. 26, 1922.
4 SHEETS—SHEET 1.
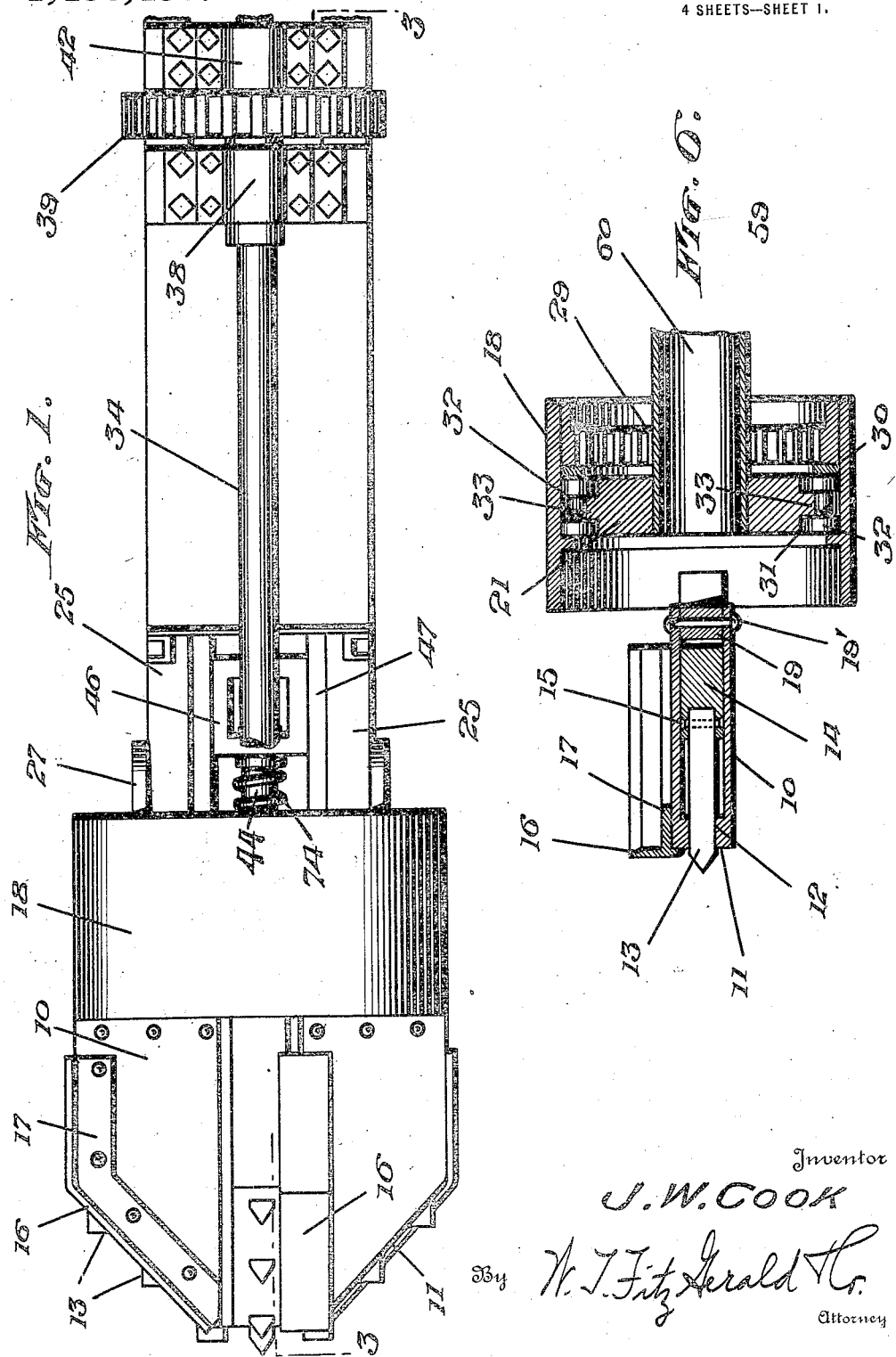
Inventor
J. W. Cook
By W. J. FitzGerald &Co.
Attorney

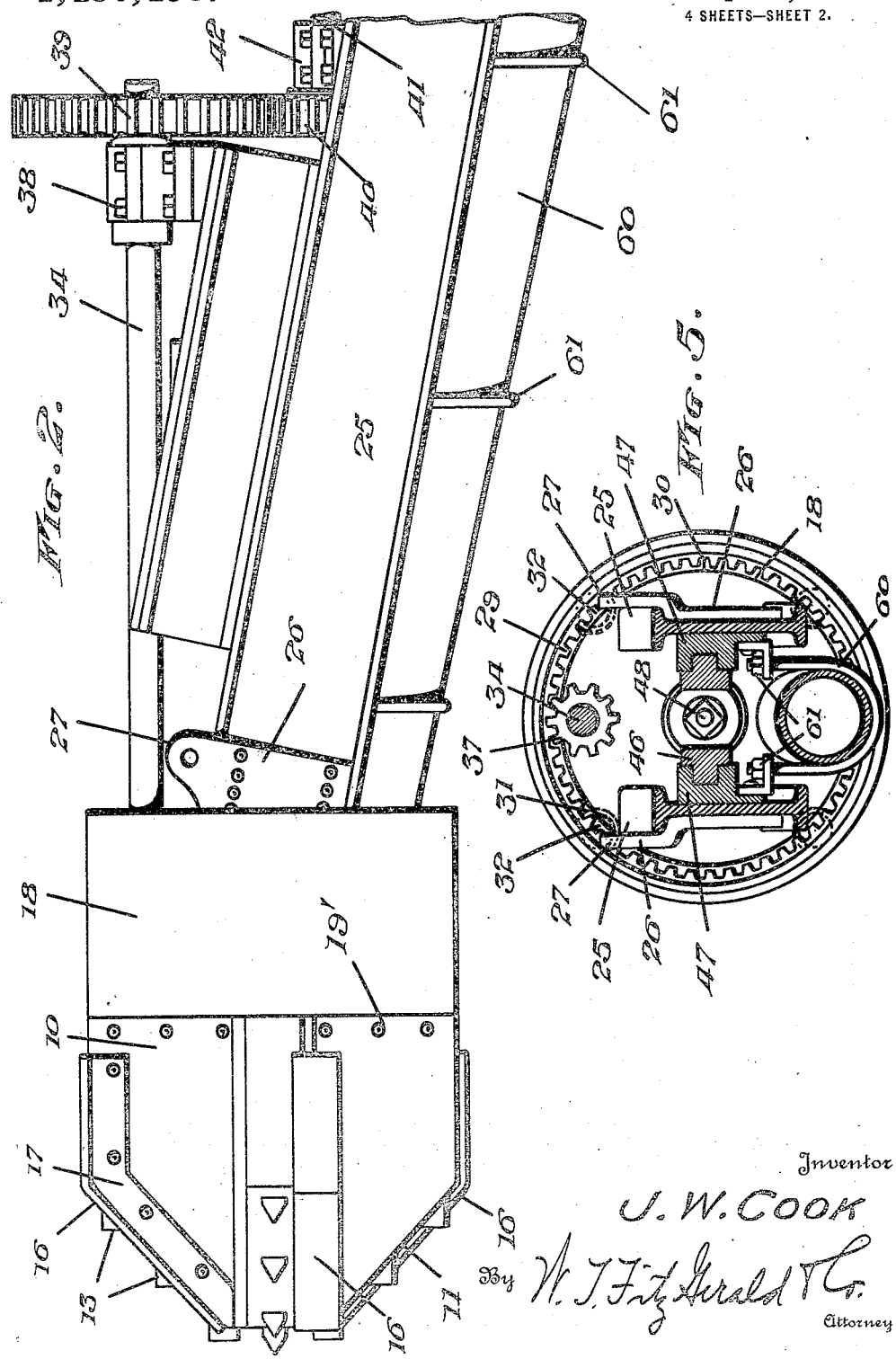

J. W. COOK.
ROCK CUTTING MACHINE.
APPLICATION FILED DEC. 13, 1920.
1,430,493.
Patented Sept. 26, 1922.
4 SHEETS—SHEET 3.
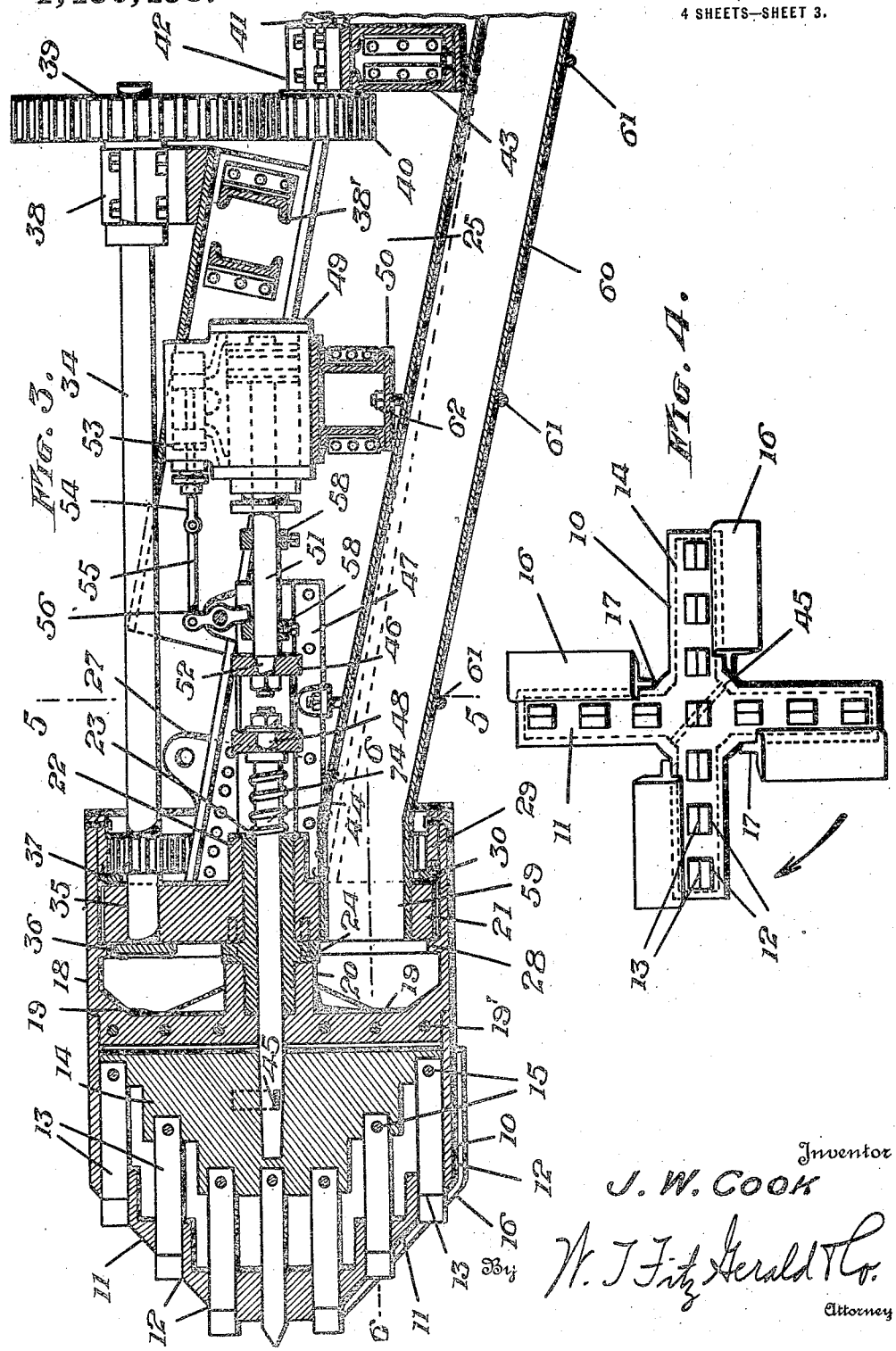
Inventor
J. W. Cook
By W. J. Fitz Gerald & Co.
Attorney

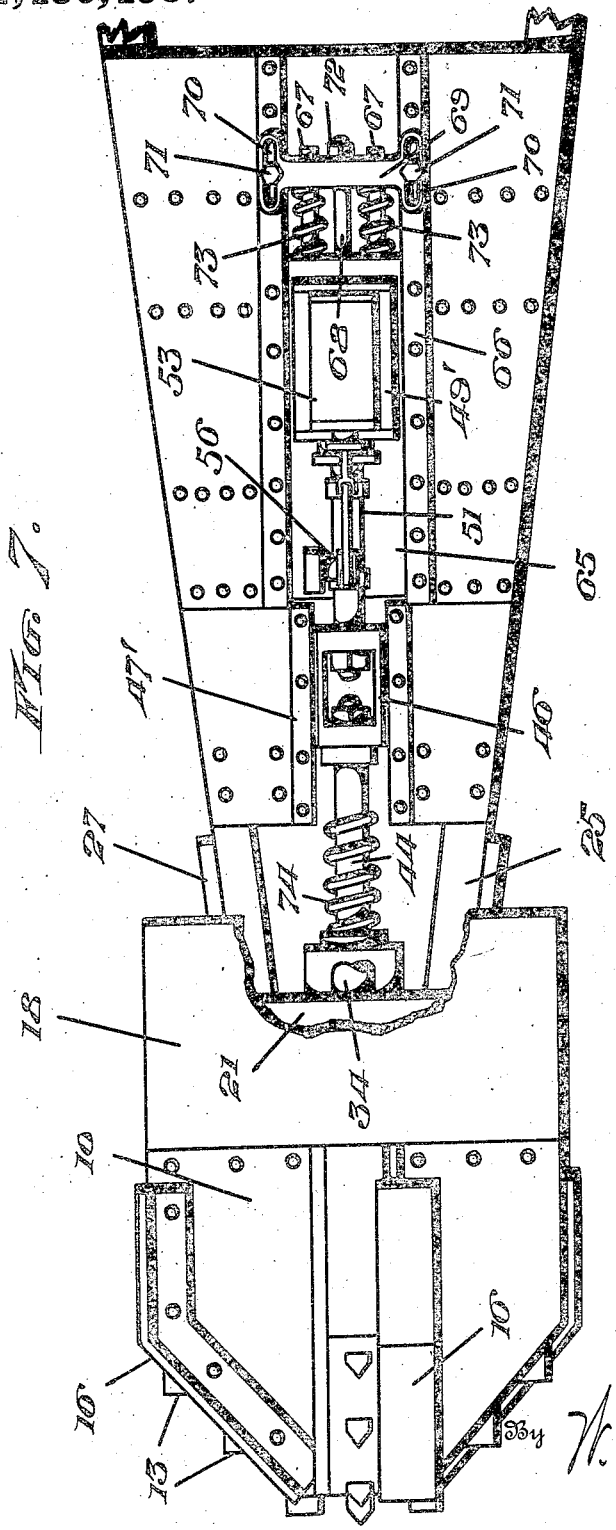

Patented Sept. 26, 1922.

1,430,493

UNITED STATES PATENT OFFICE.

JOHN W. COOK, OF MIAMI, FLORIDA.

ROCK-CUTTING MACHINE.

Application filed December 13, 1920. Serial No. 430,329.

*To all whom it may concern:*

Be it known that I, JOHN W. COOK, a citizen of the United States, residing at Miami, in the county of Dade and State of Florida, have invented certain new and useful Improvements in Rock-Cutting Machines; and I do hereby declare the following to be a full, clear, and exact description of the invention, such as will enable others skilled in the art to which it appertains to make and use the same.

The present invention relates to rock cutting machines, and is particularly an improvement over my former Patent No. 1,190,014, granted April 18, 1916.

One of the objects of the invention is the provision of a novel and improved cutter head in which the cutting bits and their holder operate, the arrangement being such that the material cannot clog the cutter head or interfere with the reciprocation of the bits.

Another object is the provision of a cutter head having a conical active end through which the bits work, and provided with blades that assist in loosening the material and working same rearwardly along the cutter head.

A further object of the invention is the provision of novel means for mounting the cutter head for rotation and for rotating same.

A still further object is the provision of novel means for reciprocating the bits during the rotation of the cutter head.

Another object is the provision of means for carrying the water, mud, rock, and materials from the cutter head.

The invention has for another object the provision of such a device providing for the efficient passage of the material rearwardly along the cutter head to the point of withdrawal.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a plan view of the machine.

Fig. 2 is a side elevation thereof.

Fig. 3 is a longitudinal section taken substantially on the lines 3—3 of Fig. 1.

Fig. 4 is a front end view of the cutter head.

Fig. 5 is a cross-section taken on the line 5—5 of Fig. 3.

Fig. 6 is a longitudinal section on the line 6—6 of Fig. 3.

Fig. 7 is a plan view of the machine including some modifications, portions being broken away.

The cutter head 10 is hollow and of X-shape in cross-section, and has radial wings. The forward end of the cutter head is conical, that is, the forward ends of the radial wings are arranged obliquely and diverge rearwardly, as at 11, and said wings have the openings 12 in their forward ends through which the chisel bits 13 are slidable longitudinally. A bit holder 14 is slidable within the cutter head 10, being of the same shape, and the rear inner ends of the bits 13 are secured, as at 15, to the holder 14 with their sharp ends projecting forwardly from the cutter head to be projected and retracted when the holder 14 is reciprocated.

Cutter blades 16 extend along the forward oblique ends 11 of the wings of the cutter head and along the longitudinal edges of said wings, and extend in one direction circumferentially of the cutter head, whereby said head in rotating in the direction of the arrow in Fig. 4 will result in said blades assisting in the loosening of the material and the boring of the cutter head into the rock, as well as directing the material rearwardly between the wings of the cutter head. Said blades 16 have flanges 17 overlapping and secured to the wings of the cutter head.

The cutter head is supported for rotation by an annular shell 18, which is provided at the forward end thereof with radial spokes or arms 19 which are fitted within the rear open ends of the wings of the cutter head, and said wings and arms are secured together, as at 20, thereby closing the rear end of the cutter head, and excluding foreign matter from the cutter head, it being noted that the sides of the wings are also closed, while the bits 13 close the openings 12. The cutter head 10 is thus secured to the shell 13 and the forward end of the shell is open, whereby the material can pass rearwardly from the cutter head to the shell between the arms 19, which merge at their inner ends into a hub 20.

The shell 18 is mounted for rotation on and around a disk 21 which has a hub 22 in which a bushing 23 is fitted, and the hub 20 of the shell 18 is rotatable on the forward portion of said bushing. The bushing has a flange 24 between the disk 21 and the hub 20 secured to said disk.

The disk 21 is supported at the end of a boom or frame comprising a pair of parallel I-beams 25 which abut said disk, and the disk has rearwardly extending plates 26 overlapping and fitting the beams 25 and secured thereto. Said plates 26 have apertured ears 27 extending upwardly for the engagement of a hoisting or derrick cable for raising and lowering the cutter head.

The shell 18 has an annular rib 28 therein contacting with the forward side of the disk 21, and an internal gear 29 is secured within the rear end portion of said shell, and a ring 30 is secured to the forward edge of the gear 29 and bears against the rear side of the disk, so that the peripheral portion of the disk is located between the ring 30 and rib 28. The gear 29 and ring 30 are preferably split into sections for the ready insertion and securing thereof within the sleeve.

In order to reduce friction between the disk 21 and shell 18, said disk has recesses or notches 31 in the peripheral portion thereof in which rollers 32 are disposed for the contact of the shell. Said rollers are spool-shaped and the disk has webs or portions 33 extending between the enlarged end portions of the rollers for holding said rollers in position. The shell 18 thus turns on the rollers 32, which can rotate within the recesses 31, and said rollers can be located at suitably spaced points around the periphery of the disk.

In order to rotate the cutter head, a longitudinal shaft 34 has its forward terminal journaled within an opening 35 in the disk (near the top portion of the disk as shown) and said end of the shaft abuts a thrust plate 35 secured to the disk at the forward end of said opening. A pinion 37 is secured on said shaft and meshes with the internal gear 29, whereby to rotate the cutter head slower than the shaft 34. The rear portion of said shaft is journaled in a bearing 38 supported on a yoke or cross piece 38' connecting the beams 25, and a gear wheel 39 secured on the rear terminal of the shaft 34 meshes with a pinion 40 secured on the forward end of the longitudinal drive shaft 41 journaled in a bearing 42 carried by a cross piece 43 connecting the beams 25. The drive shaft 41 is rotated by a suitable source of power (not shown) for turning the cutter head.

During the rotation of the cutter head, the bits 13 are reciprocated longitudinally and, for this purpose, a shaft 44 is slidable through the bushing 23 and its forward terminal is tapered and fitted within the holder 14, and said holder is secured on the shaft 44 by a taper pin 45 or other suitable means. The rear terminal of the shaft 44 is swivelled, as at 48, within one end of a cross head 46 which is slidable in and between longitudinal guides 47 secured to the beams 25. The shaft 44 is reciprocated by a fluid pressure engine, to be operated by compressed air, steam, or the like, and such engine includes a cylinder 49 secured on a cross piece 50 between the beams 25 below the shaft 34. The piston rod 51 extends forwardly from the cylinder 49 and is secured, as at 52, within the rear end of the cross head 46, whereby to reciprocate the shaft 24, and said shaft can rotate with the holder 14 and cutter head 10 due to the swivel connection 48 between the shaft 44 and cross head 46. The cylinder 49 has any suitable reversing valve 53, the stem 44 of which is connected by a link 55 to a lever 56 operated by collars 58 on the piston rod 51, whereby when the piston reaches the ends of its forward and backward movement, the valve 53 is reversed, to cause the reciprocation of the piston.

In order that water, mud, pieces of rock, and the like, can be withdrawn from the cutter head, the disk 21 has an opening 59, which is located below the center, as shown, and suction pipe or conduit 60 extends along the boom or frame and has its end fitted within the opening 59. Said pipe or conduit is supported from the boom, such as by means of U-shaped hangers 61 in which the pipe is hung, and the terminals of said hangers can engage the cross pieces and other parts of the boom to be secured thereto by means of nuts 62 or the like. The suction pipe 60 is of especial use when dredging, for drawing the water, mud, rock, and other matter from in front of the disk 21 within the shell 18 through the pipe, it being noted that the material passes rearwardly along the cutter head between the wings of the shell. Also, in dredging, it is preferable to use compressed air for the cylinder 49, instead of steam, owing to the condensation of steam when used below the surface of water, The pressure fluid can be piped to the engine in any suitable manner.

In operation, the cutter head can be rotated and the disk 13 reciprocated simultaneously, thereby obtaining an efficient cutting action to disintegrate and bore into the rock, and the blades 16 will assist in such boring action, and will work the material rearwardly along the cutter head to pass into the shell 18. The rear ends of the bits 13 and holder 14 are entirely enclosed, so as not to be interfered with by the rock or other foreign matter, which can not lodge between the holder 14 and cross head.

In the modified construction shown in Fig. 7, the beams 25 of the boom or frame converge to the cutter head, so that said boom or frame is of tapered form. A coiled buffer spring 74 is also disposed on the shaft 44 and bears against the bearing 23, for the contact of the cross head 46 when moved forwardly whereby to cushion the forward motion of the piston and chisel bits 13. The cross head 46 is slidable in guides 47' and the engine cylinder 49' and valve gear are mounted on a slide plate 65 movable longitudinally in guides 66 on the frame. The rear end of said plate 65 has stems or rods 67 and 68 projecting therefrom and slidable through a transverse yoke or member 69 which has longitudinal slots 70 at its ends receiving clamping bolts 71 carried by the guides 66, whereby said yoke can be adjusted to different longitudinal positions of the frame and clamped in place. A nut 72 or other stop member is engaged upon the rear protruding end of the rod 68 to contact with the yoke and limit the forward movement of the plate 65, and coiled expansion springs 73 are disposed on the rods 67 and confined between the plate 65 and yoke 69 to yieldingly move the plate 65 forwardly. The yoke 69 can be adjusted to position the plate 65 and cylinder 49' as desired, and by thus slidably mounting the engine and its valve gear, should the chisel bits 13 strike an unyielding object so that the forward movement of the piston is stopped, then the cylinder 49' and valve gear can slide rearwardly with the plate 65 against the tension of the springs 73. The springs again return the plate 65 and engine to normal position when the obstruction is removed or the bits 13 released. This will save the engine from abnormal or injurious strains. The spring 74 cushions the parts in their forward motion, and the springs 73 also cushion the parts in their rearward motion by letting the cylinder 49' yield rearwardly, as well as permitting yielding action when the piston and corresponding parts are stopped in their forward motion. The spring 74 is also preferably used in the other form of machine, as shown in Fig. 3.

Having thus described the invention, what is claimed as new is:—

1. A cutting machine comprising a hollow cutter head, bits working within and projecting from said cutter head, a holder for the bits mounted for reciprocation within the cutter head, said cutter head being closed to exclude foreign matter, means for mounting said head for rotation, and means for reciprocating said holder.

2. A cutting machine comprising a hollow cutter head, having radial wings and openings in the forward ends of said wings, bits slidable in said openings, a holder of the same shape as the cutter head slidable therein and to which said bits are secured, said cutter head being closed to exclude foreign matter therefrom, means for mounting said cutter head for rotation, and means for reciprocating said holder.

3. A cutting machine comprising a hollow cutter head having radial wings, a holder slidable within said cutter head, bits secured to the holder and slidable through the forward ends of said wings, a shell mounted for rotation and having radial arms secured within the rear ends of said wings, and means for reciprocating said holder.

4. A cutting machine comprising a supporting frame, a disk carried by said frame, a hollow cutter head having radial wings, a holder slidable in said cutter head, bits secured to said holder and slidable through the forward ends of said wings, a shell rotatable around said disk and having radial arms secured within the rear ends of said wings, a hub to which said arms extend, means for rotating said shell, and reciprocating means including rod extending through said disk and hub and secured to said holder.

5. A cutting machine comprising a hollow cutter head having radial wings, bits working within said cutter head and projecting from the forward ends of said wings, a shell carrying said cutter head into which the material can pass from between said wings, means for closing the rear ends of said wings to exclude foreign matter from the interior of said cutter head, a disk on which said shell is rotatable having an outlet opening, means for rotating said shell, and means extending into the cutter head for reciprocating said bits.

6. A cutting machine comprising a supporting frame, a disk carried by said frame, a shell rotatable around said disk, a bushing secured in said disk, said shell having radial arms merging into a hub, said hub being rotatable on said bushing, a hollow cutter head secured to said arms, a holder slidable within said cutter head, bits secured to the holder and projecting from the cutter head, means for rotating said shell, and reciprocating means including a rod extending through said bushing and secured to said holder.

7. A cutting machine comprising a supporting frame, a disk carried thereby, a shell rotatable around said disk, a cutter head carried by said shell and having radial wings for the passage of material between said wings into the shell, reciprocating bits within the cutter head projecting therefrom, means extending through said disk and into the cutter head for reciprocating said bits, said disk having an outlet opening, and a suction pipe extending along and supported from said frame, having its end extending to said opening.

8. A cutting machine comprising a supporting frame, a disk supported therefrom, a shell rotatable around the disk, a cutter head carried by the shell, a holder slidable within the cutter head, bits secured to the holder and projecting from the cutter head, a shaft slidable through the disk and secured to said holder, a cross head to which said shaft is swivelled, guides for the cross head carried by said frame, and a fluid pressure engine carried by the frame having a piston rod connected to said cross head.

9. A cutting machine comprising a frame, a rotary cutter head carried thereby having reciprocatory bits, an engine mounted for sliding movement on the frame, a connection between said bits and engine for reciprocating the bits, means for rotating the cutter head, and spring means yieldingly holding the engine in advanced position and enabling the engine to move rearwardly when the motion of the bits forwardly is stopped.

10. A cutting machine comprising a frame, a cutter head carried by the frame including reciprocatory bits, an engine connected to the bits for reciprocating same forwardly and rearwardly, a plate slidably mounted on the frame carrying said engine, an adjustable member on the frame, spring means between said member and plate for moving the plate forwardly and permitting the plate and engine to yield rearwardly when the forward motion of said bits is stopped, and means between said plate and member for limiting the forward motion of said plate.

11. A cutting machine comprising a frame, a cutter head carried by the frame including reciprocatory bits, an engine connected to said bits for reciprocating same forwardly and rearwardly, a plate slidably mounted for forward and rearward movement on the frame and carrying said engine, a yoke mounted for forward and rearward adjustment on the frame, rods extending from said plate and slidable in said yoke, means on one of said rods for limiting the forward movement of said plate, and spring means on the other rods between said yoke and plate for yieldingly moving the plate forwardly.

In testimony whereof I have signed my name to this specification in the presence of two subscribing witnesses.

JOHN W. COOK.

Witnesses:
ORLO E. HAINLIN,
GRACE MORRIS.